(12) United States Patent
Hörnig

(10) Patent No.: US 7,402,812 B2
(45) Date of Patent: Jul. 22, 2008

(54) METHOD FOR GAIN CALIBRATION OF AN X-RAY IMAGING SYSTEM, AND X-RAY IMAGING SYSTEM

(75) Inventor: Mathias Hörnig, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 75 days.

(21) Appl. No.: 11/592,124

(22) Filed: Nov. 3, 2006

(65) Prior Publication Data
US 2007/0102644 A1   May 10, 2007

(30) Foreign Application Priority Data
Nov. 7, 2005 (DE) .................. 10 2005 052 979

(51) Int. Cl.
*G01T 1/24* (2006.01)
(52) U.S. Cl. .................. 250/370.09; 250/371; 378/207
(58) Field of Classification Search ............ 250/370.09, 250/317, 252.1; 378/207; 341/241
See application file for complete search history.

(56) References Cited

U.S. PATENT DOCUMENTS

| | | | | |
|---|---|---|---|---|
| 5,818,900 A | * | 10/1998 | Vogelsong et al. | ............ 378/62 |
| 6,350,985 B1 | * | 2/2002 | Rodricks et al. | ......... 250/252.1 |
| 6,381,374 B1 | * | 4/2002 | Pourjavid | .................. 382/275 |
| 6,471,400 B1 | * | 10/2002 | Simanovsky et al. | ........ 378/207 |
| 2005/0092909 A1 | * | 5/2005 | Spahn | ..................... 250/252.1 |

OTHER PUBLICATIONS

M. Spahn et al. Flachbilddetektoren in der Röntgendiagnostik, Radiologe 43, 2004, Seite 340-350.
Spahn, M. et al., "Flachbilddetektoren in der Röntgendiagnostik", Radiologe, 2003, 43:340-350.

* cited by examiner

*Primary Examiner*—David P. Porta
*Assistant Examiner*—Jessica L Eley
(74) *Attorney, Agent, or Firm*—Harness, Dickey & Pierce

(57) ABSTRACT

In order to increase the useful surface of an X-ray detector, in particular a flat image detector, a method is provided for gain calibration of an X-ray imaging system with a digital X-ray detector including an active matrix having pixel readout units. Pixels are read out from the pixel readout units, and a brightness drop below a defined threshold is determined for the read out pixels by an image processing unit. The pixel readout units having a brightness drop below the defined threshold are specified with regard to a cause of the brightness drop. Further, as a function of the specification, it is defined for which image raw values, subsequently read out from the affected pixel readout units, a gain correction is to be undertaken.

22 Claims, 2 Drawing Sheets

METHOD FOR GAIN CALIBRATION OF AN X-RAY IMAGING SYSTEM, AND X-RAY IMAGING SYSTEM

PRIORITY STATEMENT

The present application hereby claims priority under 35 U.S.C. §119 on German patent application number DE 10 2005 052 979.8 filed Nov. 7, 2005, the entire contents of which is hereby incorporated herein by reference.

FIELD

The invention generally relates to a method for gain calibration of an X-ray imaging system, and/or to an X-ray imaging system.

BACKGROUND

Examples of what are known in digital X-ray imaging are image intensifier camera systems based on television or CCD cameras, storage film systems with an integrated or external readout unit, systems with optical coupling of the converter foil to CCD cameras or CMOS chips, selenium-based detectors with electrostatic readout, and solid state detectors with active readout matrices with direct or indirect conversion of the X radiation.

In particular, for a few years solid state detectors have been finding application for digital X-ray imaging. Such a detector is based on an active readout matrix, for example made from amorphous silicon (a-Si), that is precoated with an X-ray converter layer or simulator layer, for example made from cesium iodide (CsI). The incident X radiation is firstly converted into visible light in the scintillator layer. The active matrix is subdivided into a multiplicity of pixel readout units with photodiodes that in turn convert this light into electric charge and store it in a spatially resolved fashion.

An active readout matrix made from active silicon is likewise used in the case of a so called directly converting solid state detector. However, this active readout matrix is arranged downstream of a converter layer, for example made from selenium, in which the incident X radiation is corrected directly into electric charge. This charge is then stored, in turn, in a pixel readout unit of the readout matrix. Reference may also be made as regards the technical background of a solid state detector to M. Spahn et al., "Flachbilddetektoren in der Röntgendiagnostik" ["Flat image detectors in X-ray diagnostics"], Der Radiologe 43 (2003), pages 340 to 350.

The amount of charge stored in a pixel readout unit determines the brightness of a pixel of the X-ray image. Each pixel readout unit of the readout matrix therefore corresponds to a pixel of the X-ray image.

A characteristic of an X-ray detector that is decisive for the image quality is that the detector efficiency of the individual pixel readout units deviate from one another more or less strongly. This can be seen in that two pixel readout units supply raw image values with different brightness even if they are irradiated with the same light intensity. The resulting, unprocessed raw X-ray image has a comparatively poor image quality because of this brightness fluctuation. Other factors contributing to the brightness fluctuation are spatially dependent fluctuations in the thickness of the scintillator layer, the dependence of the scintillator layer on the radiation quality, a qualitatively different adhesion between scintillator layer and detector plate, and inhomogeneities in the irradiated X-ray field. Consequently, a continually strong brightness drop usually occurs in the edge regions of the X-ray detector.

It is customary to calibrate a digital X-ray detector in order to improve the image quality. To this end, a calibration image is recorded in conjunction with a constant X-ray exposure, which is also denoted as "gain image". The brightnesses of the individual pixels, the gain values, are compared with a normalized gain brightness value. If the measured gain value is above a defined upper threshold value (for example 200 percent), or a below a defined lower threshold value (for example 25 percent) of a gain value normalized over all the pixels, the corresponding pixel readout units are assumed to be defective and either no longer used at all for the X-ray imaging, or subjected to a complicated correction of defects. The remaining gain image is mathematically combined with the X-ray images recorded during the later normal operation of the X-ray detector, for example multiplied such that the brightness fluctuations present in both images in about the same way are at least partially compensated.

SUMMARY

Thus, because of the brightness drop that is chiefly present in the edge regions the useful surface of an X-ray detector is less than the actually active surface. In at least one embodiment of the invention, a method is provided by which the useful surface of an X-ray detector, in particular of a flat image detector, can be increased. In at least one embodiment of the invention, an X-ray imaging system is provided that has an X-ray detector with a larger useful surface than in the prior art.

A method according to at least one embodiment of the invention includes a method for gain calibration of an X-ray imaging system. An apparatus of at least one embodiment of the invention includes an X-ray imaging system.

Owing to the method according to at least one embodiment of the invention, pixel readout units affected by a brightness drop, particularly in the edge regions of the active matrix, are not assumed to be defective as a whole, but the cause of the brightness drop is specified such that it is possible as a function thereof to carry out a gain correction or reject it. Owing to at least one embodiment of this method, many pixel readout units that are declared effective as a whole in the prior art, and therefore remain either completely unused or need to be subjected to a complicated correction of defects, can be rendered useful for imaging as a function of the cause after the latter has been specified. The actually useful surface of the X-ray detector is thereby increased. By way of example, in the case of a brightness drop caused by the scintillator a gain correction can frequently be carried out rationally, specifically whenever the scintillator is less effective, but functional, owing to less needle growth or to adhesion.

A brightness drop is advantageously determined only in the case of pixel readout units that are arranged in the edge region of the active matrix and/or a detector plate. Specifically, the brightness drop can frequently ascribe here to a scintillator layer of tapering layer thickness, and correcting the brightness drop is ration in such a case. For example, the outermost 10 pixel rows or pixel columns of the digital X-ray detector are denoted as the edge region of the active matrix and/or of a detector plate (for example in the case of an active matrix with a butt joint, that is to say bonded together from a number of detector plates). Particularly in the case of an active matrix with butting, it can also be advantageous to apply the method according to at least one embodiment of the invention to the complete active matrix, in order to compensate differences in brightness between individual detector plates.

According to one refinement of at least one embodiment of the invention, at least two gain images are recorded and stored in conjunction with different reset light intensities. These gain images can, for example, serve as a basis for determining a brightness drop below a defined lower threshold value, or a rise in brightness above a defined upper threshold value. Moreover, two gain images of different reset light intensities can be used to determine a relationship between the reset light intensities and the brightnesses of the respectively resulting pixels. This relationship can be used as a basis for a specification.

A brightness drop of pixel readout units below the defined threshold is expediently determined from at least two of the gain images recorded in conjunction with different reset light intensities. A further evaluation is substantially simplified thereby.

According to a further refinement of at least one embodiment of the invention, at least two gain images recorded with different reset light intensities are used for the specification. According to a further refinement of at least one embodiment of the invention, it is possible to this end to compare the at least two gain images with one another. It is thereby possible to determine the cause of the brightness drop in a simple way, or at least to delimit it.

For pixel readout units from which it is possible to determine a brightness drop below the defined threshold in conjunction with various reset light intensities, the scintillator is expediently determined as the cause of the brightness drop. If the same pixels are below the defined threshold with regard to their brightness independently of the reset light intensity, it may be deduced therefrom that a brightness drop occurs independently of the reset light intensity.

If, moreover, the brightnesses of the same pixels show the same relationship in different gain images as the reset light intensities, the cause of the brightness drop is a restricted functionality of the scintillator, for example owing to a smaller needle growth or bonding areas.

According to a further refinement of at least one embodiment of the invention, a gain correction is undertaken in the case of a brightness drop caused by the scintillator, in conjunction with image raw values read out from the relevant pixel readout units. In such a case, it is rational to be able to carry out the gain correction such that the affected pixel readout units can be used for imaging, and there is no need to restrict the useful surface of the X-ray detector.

A particularly advantageous possibility of using at least one embodiment of the invention is provided by an X-ray imaging system with a digital X-ray detector, a particularly flat detector, having an active matrix consisting of a multiplicity of pixel readout units having raw image values, and with an image processing unit for storing, processing and correcting raw X-ray values.

BRIEF DESCRIPTION OF THE DRAWINGS

The invention and further advantageous refinements in accordance with features of the subclaims are explained below in more detail in the drawings with the aid of schematically illustrated example embodiments, without thereby restricting the invention to these example embodiments. In the drawings:

DETAILED DESCRIPTION OF THE EXAMPLE EMBODIMENTS

Figure 1:
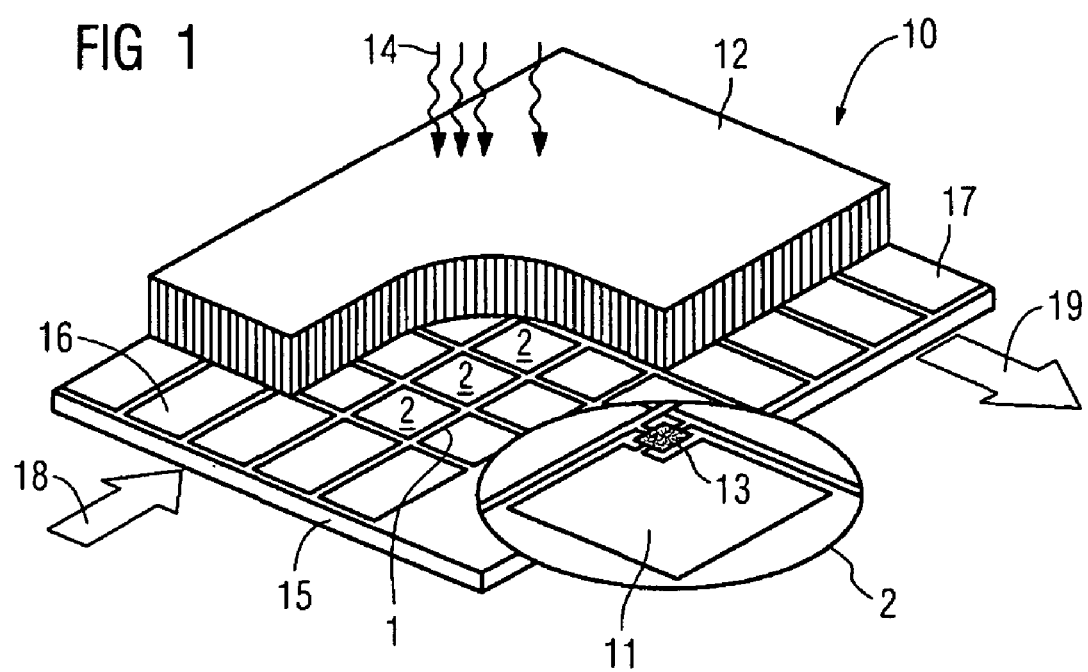
FIG. 1 shows a perspective elevation of a known flat detector with indirect conversion.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

The example of a known, indirectly converting flat detector 10 for which the method according to an embodiment of the invention is suitable is shown in FIG. 1. It includes a flat active readout matrix 1 made from amorphous silicon (aSi), that is mounted on a flat substrate 15 made from glass. The readout matrix includes, over all, a multiplicity of individual pixel readout units 2, and can have one or more combined detector plates. The readout matrix 1 is, in turn, downstream of a scintillator layer 12 (or converter layer), for example made from cesium iodide (CsI). The incident X radiation 14 is converted in this scintillator layer 12 into visible light that is converted into electric charge in photodiodes 11 of the pixel readout units 2.

The electric charge is stored in the pixel readout units 2, once again in a spatially resolved fashion. Each pixel readout unit 2 likewise has a readout switch 13 via which the stored charge can be read out. To this end, the active readout matrix is driven in the direction of the first arrow 18 by means of a drive electronic 16, while the readout is performed in the direction of the second arrow 19 by a readout electronic 17. Conversions to raw image data are generated from the respective charges by way of amplification and analog-to-digital conversion. The raw image data are subjected to various correction methods, in general in a correction unit that is assigned to the solid stated detector or is located in an image system. The methods include, for example, an offset correction, a gain correction or a defect correction.

Figure 2:
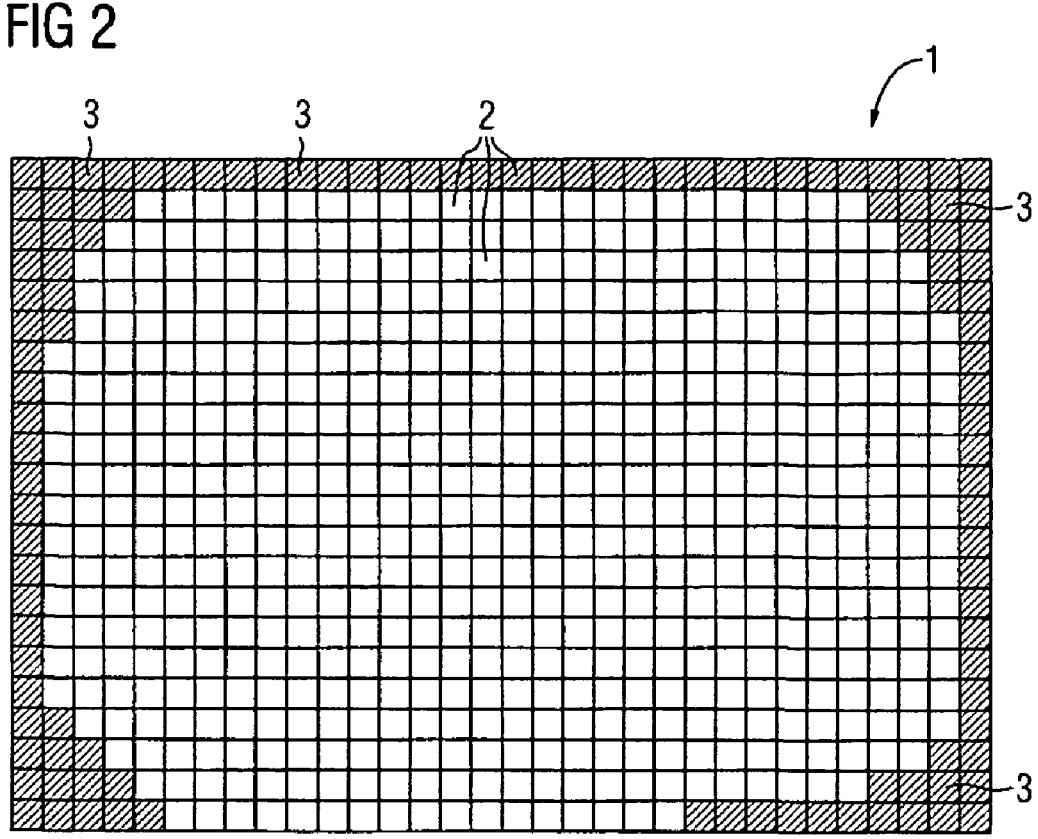
FIG. 2 shows a plan view of an active matrix of an X-ray detector.

FIG. 2 shows a plan view of an active readout matrix 1 subdivided into pixel readout units 2, pixel readout units 3 located in an edge region of the active readout matrix being indicated with a clear brightness drop, by way of example. The nature of such a brightness drop is, for example, that, given a standard gain calibration, these pixel readout units 3 with a clear brightness drop have less than 25 percent of a brightness value normalized over all the pixels of the active matrix. According to the prior art, the pixel readout units 3 with a clear brightness drop would be assumed in this case to be defective, and the surface useful for imaging would be reduced, and/or there will be a need for complicated methods for correcting defects.

Figure 3:
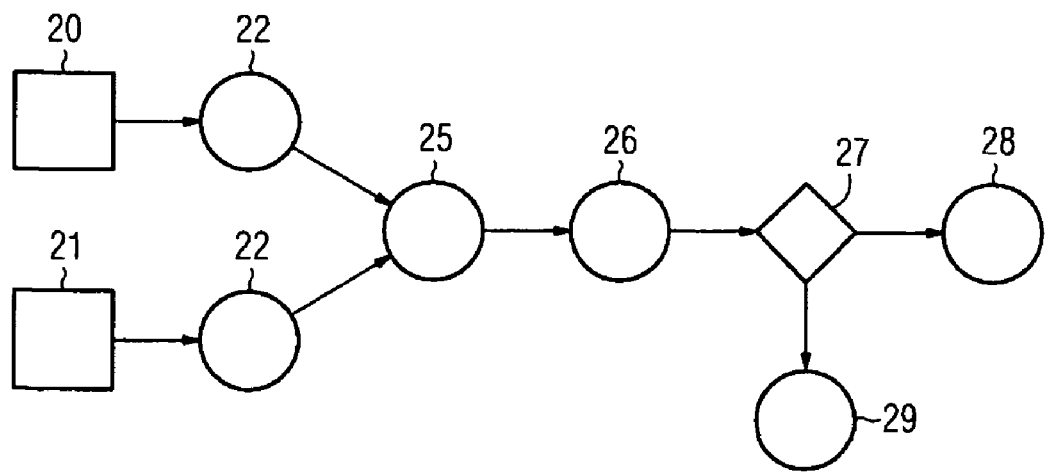
FIG. 3 shows a flowchart of a method according to an embodiment of the invention for gain calibration with specification.

FIG. 3 shows for an X-ray detector a configuration of a gain calibration method according to an embodiment of the invention which is such that a first gain image 20 or, given a first reset light intensity, the pixels thereof, and a second gain image 21 or, given a second reset light intensity, the pixels thereof, are recorded and read out. The read out gain images 20; 21 are lead to an image processing unit. The image processing unit can be integrated in the X-ray detector, or be arranged outside thereof.

The image processing unit then uses the pixels of the two gain images 20; 21 to determine in a first image processing method 22 respectively which pixels have a brightness drop below a defined threshold. This defined threshold can be, for example, 25 percent of the brightness value normalized over all the pixels of the active matrix. The first image processing method 22 for determining the brightness drop can be carried out as a known method.

In the case of a conventional gain calibration method, all the pixel readout units whose brightness drop is below the defined threshold of, for example, 25 percent would be assumed to be defective, and would therefore be useless for the image acquisition. In the case of the method according to an embodiment of the invention, the X-ray read out units are, however further considered by undertaking to specify the cause of the brightness drop. Subsequent thereto, it is established as a function of the cause whether it is rational or not to correct the brightness drop.

After the brightness drop has been determined, the pixels of the first gain image 20, which have a brightness drop below the defined threshold, and the pixels of the second gain image 21, which have a brightness drop below the defined threshold, are stored. In order to be able to carry out a specification 26 of the cause of the brightness drop, the two gain images 20; 21 are compared with one another as regards their brightness values or as regards their brightness drop. Again, this is performed, for example, by the image processing unit in a second image processing method 25. The relationship between the brightness values and the reset light intensities is also found in order to determine the cause of the brightness drop.

If, for example, the second reset light intensity of the second gain image 21 is five times the value of the first reset light intensity of the first gain image 20, the gain relationship between the brightness rates in the ratio of one-fold to five-fold is to be expected even in the case of the pixels read out from the pixel readout units, given the detector plate that is functioning without interference. Thus, if such a relationship, for example a linear one, is to be observed for the pixels that are below the brightness threshold, the cause of the brightness drop lies in the scintillator that is functioning in a restricted fashion. Such an analysis is carried out for each individual pixel having a brightness drop in the case of at least one reset light intensity; a specification 26 by which the cause of the brightness drop is assigned to the respective pixel in thereby performed for each pixel.

Depending on the cause of the brightness drop, it is then stipulated in a decision step 27 for which raw image values subsequently read out from the affected pixel readout units a gain correction 28 is undertaken. Since a gain correction 28 is rational in the case of a scintillator that is functioning in a restricted fashion, for example owing to a scintillator layer becoming thinner in the edge region, it is stipulated in the case of a brightness drop owing to the scintillator that the affected pixels are provided for a gain correction 28 during subsequent recordings of X-ray images.

If the detector plate is determined as the cause of the brightness drop, it can be decided that no gain correction 28 of the pixels is performed in future X-ray recording in the case of the affected pixel readout units. Instead of this, it is possible to set the defects 29 of the pixel readout units, and to undertake a correction of the defects, or it is possible to provide a correction in which the reset light intensity of various pixels is varied.

In order to be able to distinguish a complete failure of the scintillator from a restricted functioning of the scintillator, it is possible to introduce a second lower threshold of the brightness drop, for example 1 percent. If the brightness of the pixels is below this threshold, no rational gain connection is possible that is independent of the cause of the brightness drop.

According to one refinement of an embodiment of the invention, at least one method step, but in particular all the method steps, of the gain calibration of an embodiment of the invention is/are carried out automatically. In addition to a comparison of gain maps, it is also possible to use the gain images in conjunction with different reset light intensities in order to determine the cause of the brightness drop. It is also possible, however, to use other methods in order to determine the cause and to undertake a specification 26.

The method according to an embodiment of the invention can be applied to all types of digital X-ray detectors that carry out a gain correction, for example in the case of flat image detectors or of X-ray detectors for computer tomographs.

At least one embodiment of the invention may be summarized briefly as follows:

In order to increase the useful surface of an X-ray detector, in particular a flat image detector, a method is provided for gain calibration of an X-ray imaging system with a digital X-ray detector having an active matrix including pixel readout units, in which pixels are read out from the pixel readout units, and a brightness drop below a defined threshold is determined for the read out pixels by an image processing unit, and the pixel readout units having a brightness drop below the defined threshold are specified with regard to a cause of the brightness drop, and has a function of the specification it is defined for which image raw values subsequently read out from the affected pixel readout units a gain correction is undertaken.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for gain calibration of an X-ray imaging system including a digital X-ray detector having an active matrix including pixel readout units, the method comprising:
   reading out pixels from the pixel readout units;
   determining a brightness drop below a defined threshold for the read out pixels, using an image processing unit;
   specifying the pixel readout units having a brightness drop below the defined threshold with regard to a cause of the brightness drop; and
   determining, as a function of the specification, for which image raw values, subsequently read out from the specified pixel readout units, to undertake a gain correction.

2. The method as claimed in claim 1, wherein a brightness drop is determined only for pixel readout units arranged in an edge region of at least one of the active matrix and a detector plate.

3. The method as claimed in claim 1, wherein a brightness drop is determined only for pixel readout units arranged in a pixel row or a pixel column, which pixel row or pixel column is at a distance of at most one tenth of a number of the pixel rows or pixel column from the cell row or pixel column arranged at the outermost edge.

4. The method as claimed in claim 1, wherein the defined threshold of the brightness drop is 25 percent of a brightness value normalized over all the pixels of the active matrix.

5. The method as claimed in claim 1, wherein at least two gain images are recorded and stored in conjunction with different reset light intensities.

6. The method as claimed in claim 5, wherein a brightness drop of pixel readout units below the defined threshold is determined from at least two of the gain images recorded in conjunction with different reset light intensities.

7. The method as claimed in claim 5, wherein at least two gain images, recorded with different reset light intensities, are used for the specification.

8. The method as claimed in claim 7, wherein the at least two gain images are compared with one another.

9. The method as claimed in claim 5, wherein a scintillator is determined as a cause of the brightness drop in the case of pixel readout units for which a brightness drop below the defined threshold is determinable in conjunction with various reset light intensities.

10. The method as claimed in claim 9, wherein a gain correction is undertaken in the case of a brightness drop caused by the scintillator, in conjunction with image raw values read out from the relevant pixel readout units.

11. The method as claimed in claim 1, wherein at least one method step is carried out automatically.

12. The method as claimed in claim 1, wherein all method steps are carried out automatically.

13. An X-ray imaging system, comprising:
a digital X-ray detector having an active matrix including a multiplicity of pixel readout units having raw image values; and
an image processing unit for storing, processing and correcting raw X-ray values, and for determining a brightness drop of pixels read out from pixel readout units below a defined threshold, wherein pixel readout units affected by the brightness drop are specifiable with regard to a cause of the brightness drop, and a gain correction is adapted to be carried out as a function of the specification values in conjunction with raw image values subsequently read out from the affected pixel readout units.

14. The X-ray imaging system as claimed in claim 13, wherein a brightness drop is determinable exclusively in the case of pixel readout units, arranged in the edge region of at least one of the active matrix and a detector plate.

15. The X-ray imaging system as claimed in claim 13, wherein the defined threshold of the brightness drop is 25 percent of a brightness value normalized over all the pixels of the active matrix.

16. The X-ray imaging system as claimed in claim 13, wherein at least two gain images are recordable with different reset light intensities by the X-ray imaging system, and are storable in a storage unit.

17. The X-ray imaging system as claimed in claim 16, wherein the image processing unit is for determining the brightness drop of pixel readout units below the defined threshold from at least two gain images recorded with different reset light intensities.

18. The X-ray imaging system as claimed in claim 16, wherein at least two gain images recorded with different reset light intensities are usable for the specification.

19. The X-ray imaging system as claimed in claim 16, wherein the at least two gain images are comparable with one another.

20. The X-ray imaging system as claimed in claim 16, wherein a scintillator is determined as cause of the brightness drop in the case of pixel readout units for which a brightness drop below the defined threshold is determined in conjunction with various reset light intensities.

21. The X-ray imaging system as claimed in claim 20, wherein a gain correction is undertaken in the case of a brightness drop caused by the scintillator, in conjunction with image raw values read out from the relevant pixel readout units.

22. The X-ray imaging system as claimed in claim 13, wherein the digital X-ray detector is a flat image detector.

* * * * *